(12) United States Patent
Knierim et al.

(10) Patent No.: US 6,804,306 B2
(45) Date of Patent: Oct. 12, 2004

(54) STABLE IN-PHASE/QUADRATURE (I/Q) GENERATOR METHOD AND APPARATUS

(75) Inventors: Daniel G. Knierim, Beaverton, OR (US); Barton T. Hickman, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 773 days.

(21) Appl. No.: 09/758,401

(22) Filed: Jan. 10, 2001

(65) Prior Publication Data

US 2001/0033624 A1 Oct. 25, 2001

(51) Int. Cl.[7] .......... H04L 27/00; H04L 27/04; H04L 27/06; H04B 15/00

(52) U.S. Cl. .......... 375/259; 375/295; 375/316; 375/285

(58) Field of Search .......... 375/259, 295, 375/296, 298, 308, 340, 316, 329, 330–333, 284; 329/304; 332/103–105

(56) References Cited

U.S. PATENT DOCUMENTS 5,712,879 A * 1/1998 Tatsuta et al. .............. 375/330
5,778,029 A * 7/1998 Kaufmann .................. 375/296

FOREIGN PATENT DOCUMENTS

EP          000771097 A2 *  6/1997

* cited by examiner

Primary Examiner—Tesfaldet Bocure
(74) Attorney, Agent, or Firm—Thomas F. Lenihan; James G. Stewart

(57) ABSTRACT

A method for generating an in-phase (I) output signal and a quadrature-phase (Q) output signal from an input signal reduces phase error in the I/Q generator by delaying-and-doubling an input signal to produce a Q output signal and delaying the input signal twice and subtracting the same from the input signal to produce an I output signal. The I/Q generator includes a first 90°-phase delay circuit receiving an input signal and outputting an intermediate Q signal; a second 90°-phase delay circuit receiving the intermediate Q signal and producing an intermediate I signal. It also includes a signal doubler receiving the intermediate Q signal and producing a Q output signal of twice the amplitude of the input signal at a 90° phase angle. Finally, the generator includes a signal differencer receiving the input signal and the intermediate I signal and producing an I output signal of substantially twice the amplitude of the input signal at a 0° phase angle. The first and second delay circuits need only be substantially matched with one another to render the I/Q generator amplitude and phase stable over a broad range of manufacturing process, operating temperature and input signal frequency variation.

13 Claims, 1 Drawing Sheet

STABLE IN-PHASE/QUADRATURE (I/Q) GENERATOR METHOD AND APPARATUS

BACKGROUND OF THE INVENTION

The present invention relates generally to in-phase/quadrature (I/Q) generators, and more particularly to I/Q generators that exhibit amplitude and phase stability.

Prior art techniques for generating I/Q signals can be broadly classified into three groups. The first group consists of phase- and/or delay-locked-loops which lock a delay stage or oscillator to match a quarter-period of the input signal. These techniques are complicated, require time to lock after any change in conditions, and often require off-chip components to realize a long time-constant in the loop filter.

The second group of prior art I/Q generators consists of filters that have nominally 90°-relative phase shifts and nominally matched gains, but have first-order dependencies on input frequency and process. For example, an integrator or differentiator has a fixed 90° phase shift, but the amplitude varies with changes in frequency. The performance of these filters is often unacceptable due to insufficient process control.

The third group of prior art I/Q generators consists of filters that have the first-order dependencies canceled. For example, the difference between the outputs of an integrator and a differentiator set to the same gain at the nominal frequency will have no first-order gain dependency. Thus, an increase in frequency will increase the amplitude of the differentiator but will decrease the (180° out of phase) amplitude of the integrator, thereby leaving the overall output amplitude constant to the first order. The "polyphase" filter network is another example of a circuit in this group. These filters are of higher complexity than filters in the second group, and are often hard to implement cleanly at high frequencies due to the effects of parasitic capacitances.

SUMMARY OF THE INVENTION

A method for generating an in-phase (I) output signal and a quadrature-phase (Q) output signal from an input signal reduces phase error in the I/Q generator by delaying-and-doubling an input signal to produce a Q output signal and delaying the input signal twice and subtracting the same from the input signal to produce an I output signal, whereby the delaying-and-doubling and the twice-delaying-and-subtracting steps are performed such as to introduce substantially matched amplitude and phase error and whereby the phase error of the steps substantially cancels one another.

The I/Q generator includes a first 90°-phase delay circuit receiving an input signal and outputting an intermediate Q signal; a second 90°-phase delay circuit receiving the intermediate Q signal and producing an intermediate I signal; a signal doubler receiving the intermediate Q signal and producing a Q output signal of twice the amplitude of the input signal at a 90° phase angle. Finally, the generator includes a signal differencer receiving the input signal and the intermediate I signal and producing an I output signal of substantially twice the amplitude of the input signal at a 0° phase angle. The first and second delay circuits need only be substantially matched with one another to render the I/Q generator amplitude and phase stable over a broad range of manufacturing process, operating temperature and input signal frequency variation.

DETAILED DESCRIPTION OF THE INVENTION

Figure 1:
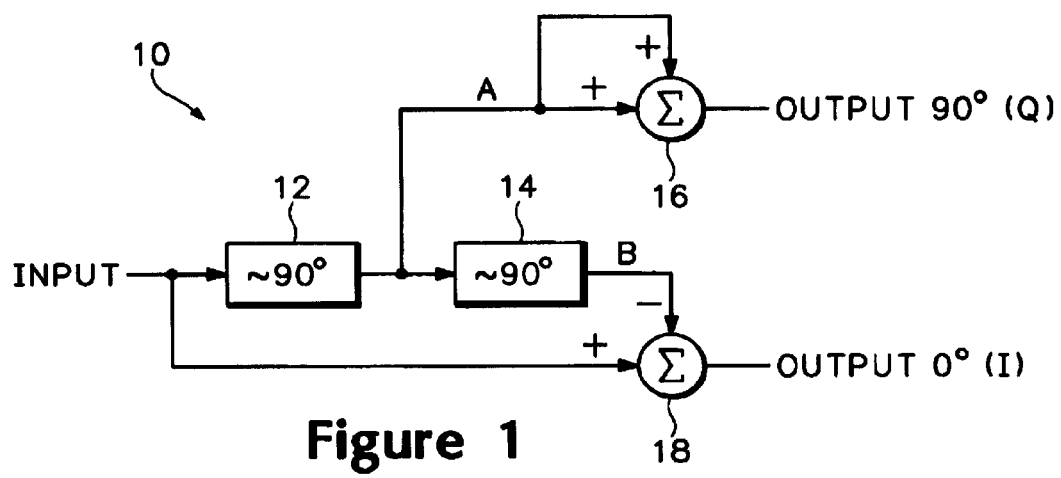
FIG. 1 is a schematic block diagram illustrating the invented stable I/Q generator in accordance with a preferred embodiment.

FIG. 1 illustrates the invented stable I/Q generator in schematic block diagram form at 10. Those of skill in the art will appreciate that I/Q generator 10 receives an input signal and generates two output signals whose phases differ by 90 degrees (90°). Thus, in accordance with a preferred embodiment of the invention, generator 10 includes a first 90°-phase delay circuit 12 receiving an INPUT signal and outputting a quadrature-phase output signal A. Generator 10 also includes a second 90°-phase delay circuit 14 receiving the quadrature-phase output signal from delay circuit 12 and outputting an in-phase output signal B.

Generator 10 further includes a signal doubler, e.g. a summer (Σ, 16 that produces an output signal Q the amplitude of which is substantially twice that of the input signal amplitude and 90° out of phase therewith. This amplitude doubling is represented in FIG. 1A by a summer 16 having identical positive inputs A, as will be understood by those of skill in the art.

Finally, generator 10 includes a signal differencer 18 that produces an output signal I that is the difference between the INPUT signal and B. This differencing performed by differencer 18 is represented by a summer (Σ) having a positive INPUT signal input and a negative B input terminal. Those of skill in the art will appreciate that the amplitude of output signal I also is substantially twice that of the INPUT signal and in phase (0° out of phase) therewith.

Substantially 90° delay circuit 12 or 14 may differ from the ideal 90° due to INPUT signal frequency, manufacturing process and/or ambient temperature variations. Nevertheless, the two outputs I and Q remain 90° out of phase with each other. This is because, in accordance with the invention, delay device 12 and delay device 14 are well matched to each other, e.g. due to identical design and layout, and because the topology of the I/Q generator is very tolerant of gain and phase error incidentally produced by such variations. Those of skill in the art will appreciate that the invention in its preferred embodiment produces gain, amplitude and phase errors that are second order due to squaring. This is because small errors, when squared, are further reduced, as will be seen.

Figure 2A:
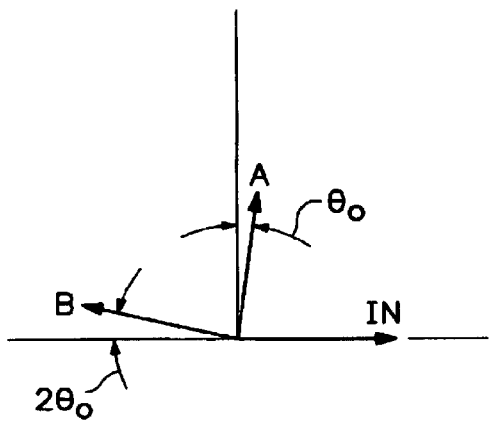
FIGS. 2A and 2B are vector diagrams illustrating the amplitude and phase stability of the stable I/Q generator illustrated in FIG. 1.
Figure 2B:
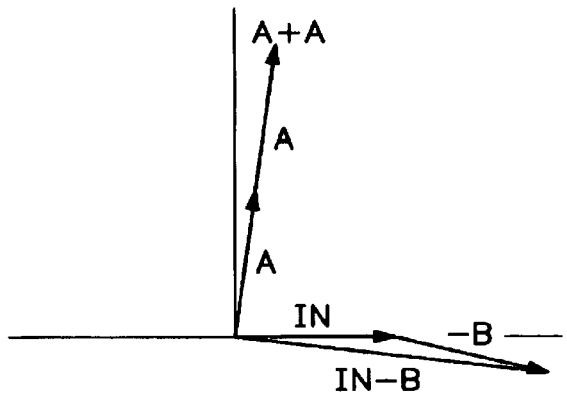

The vector diagrams of FIGS. 2A and 2B illustrate the relative insensitivity of stable I/Q generator 10 to variations in the delays imposed by delay circuit 12 and delay circuit 14. FIG. 2A illustrates a phase error $\theta_e$ introduced into signals A and B in each of 90° delay circuits 12, 14 (refer momentarily to FIG. 1). FIG. 2B illustrates that output I (INPUT−B), Q (A+A) nevertheless are 90° out of phase with one another. Thus, the only error in generating the I/Q output is that I (INPUT−B) is smaller in amplitude than Q (A+A) by a factor $\cos(\theta_e)$.

Those of skill in the art will appreciate that the following mathematical relationships hold for generator 10 in accordance with the preferred embodiment of the invention. Assume the INPUT signal to be the reference (e.g. amplitude of INPUT signal=1, phase of INPUT signal=0). Further assume that delay circuits 12, 14 each have a gain error of G and a phase error of $\theta_e$ degrees. This will be understood to correspond with gains of 1+G and phases of 90°+θ$_e$ at a given input frequency. The complex (i.e. magnitude and phase) outputs I, Q may then be described by formulas 1 and 2 as follows:

$$I=(1\angle 0)+((1+G)^2\angle 2\theta_e) \quad (1)$$

and $$Q=2(1+G)\angle(90°+\theta_e) \quad (2)$$

The I/Q ratio may be seen then to have a magnitude defined by formula 3:

$$\sqrt{1-\sin^2\theta_e,+\left(\frac{G(G+2)}{2(G+1)}\right)^2} \quad (3)$$

(where the middle term is the square of the sine of phase error θ$_e$). The I/Q ratio also may be seen to have a phase error defined by formula 4:

$$-\arcsin\left(\frac{G(G+2)\sin\theta_e}{\sqrt{(2(G+1)\cos\theta_e)^2+(G(G+2))^2}}\right) \quad (4)$$

These magnitude and phase errors may be seen to contain no first-order terms. Those of skill in the art thus will appreciate that the magnitude and phase error of generator 10 are first-order independent of the gain and phase errors of delay circuits 12, 14.

Figure 3:
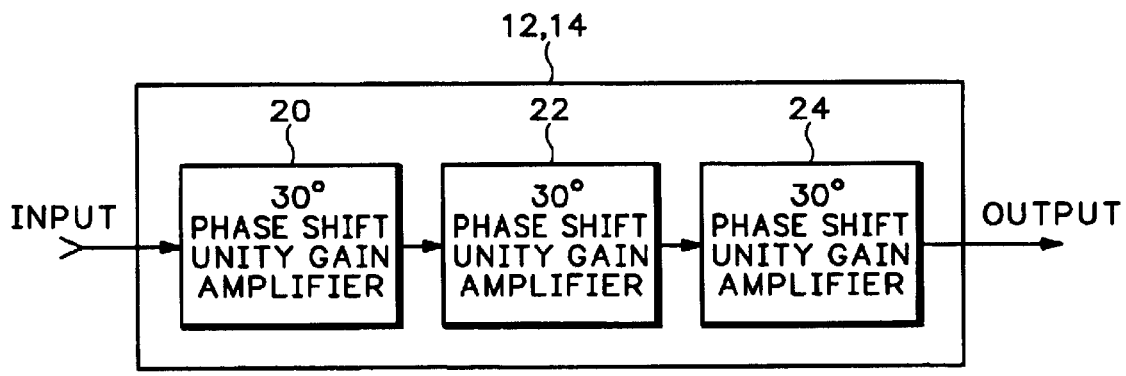
FIG. 3 is a schematic block diagram of the delay circuit of FIG. 1 made in accordance with a preferred embodiment of the invention.

Importantly, then, delay circuits 12, 14 may be implemented in any number of conventional ways. For example, delay circuits 12, 14 are implemented in a preferred embodiment of the invention very straightforwardly and simply as a series of three cascaded unity-gain differential amplifiers the standing current of each of which is adjusted to impose a 30° delay or phase shift, as shown in FIG. 3 at 20, 22, 24. Those of skill in the art will appreciate that any suitable series, cascaded differential amplifier topology—or alternative delay circuit topology—may be used to generate delay circuits 12, 14 used in novel I/Q generator 10, depending upon the application, process availability and performance and cost goals. All such implementations of delay circuits 12, 14 are within the spirit and scope of the invention.

The tolerance of I/Q generator 10 to, or its amplitude and phase stability over, a broad range of manufacturing process, operating temperature and input signal frequency variations is noted. For example, process speed variations whereby the delay of the delay elements vary one way or another by 10% (9°) due to slightly different manufacturing conditions nevertheless produce no phase error and only 1.23% amplitude error between the outputs of I/Q generator 10. Similarly, operating temperature variations that may affect the delay elements nevertheless have substantially zero effect on the phase error of I/Q generator 10 because of its unique topology and the effective squaring of error and exhibition of only second order error terms. Finally, input signal frequency variation as much as two to one have been determined to be accommodated by I/Q generator 10, again because the generator effectively squares small errors and thus even further reduces them below a first-order error term threshold.

In the foregoing analysis, only the gain errors and phase errors of the 90° delay elements have been considered. At high operating frequencies, the doubling circuit 16 and the differencing circuit 18 may also exhibit noticeable gain and phase errors. However, if both circuits are realized using identically designed two-input summers, in accordance with the preferred embodiment of the invention, they will contribute equal gain and phase errors to both outputs, and thus both outputs will remain matched in amplitude and 90° out of phase with each other.

Accordingly, effective phase error cancellation is achieved in accordance with the invention, yet with an elegantly simple, low-cost circuit that may be implemented cleanly and that performs well over a broad range of process and temperature variations and input signal frequencies, unlike prior art I/Q generators.

The preferred method of the invention now may be understood from the above FIG. 1 description. This preferred method includes delaying-and-doubling an input signal (e.g. via delay circuit 12 and doubler 16) to produce a quadrature-phase output signal. It also includes delaying the input signal twice and subtracting the same from the input signal (e.g. via delay circuits 12, 14 and differencer 18) to produce an in-phase output signal. Those of skill in the art will appreciate that the delaying-and-doubling and the twice-delaying-and-subtracting steps are performed in such manner as to introduce substantially matched amplitude and phase error. Skilled persons in the art also will appreciate that the phase error of the delaying-and-doubling and the twice-delaying-and-subtracting steps substantially cancel one another. Thus the method according to this embodiment of the invention may be seen very effectively to reduce phase error in an I/Q generator.

Finally, those of skill in the art will appreciate that the invented method and apparatus described and illustrated herein may be implemented in hardware of any suitable configuration, topology and circuit and device detail. Preferably, the apparatus is implemented as described and illustrated herein, for purposes of low component count, low cost and high performance. Alternative embodiments are contemplated, however, and are within the spirit and scope of the invention. For example, each summer could have its output gain set to one-half, so as to produce output signals at the same amplitude level, rather than double the level, of the input signal.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method of reducing phase error in an in-phase/quadrature (I/Q) generator, the method comprising:

delaying-and-doubling an input signal to produce a quadrature-phase output signal, and delaying the input signal twice and subtracting the same from the input signal to produce an in-phase output signal, whereby said delaying-and-doubling and said twice-delaying-and-subtracting steps are performed in such manner as to introduce substantially matched amplitude and phase error and whereby any phase errors introduced by said delaying-and-doubling and said twice-delaying-and-subtracting steps substantially cancel one another.

2. The method of claim 1, wherein any introduced amplitude error is low and any introduced phase error is substantially zero.

3. The method of claim 2, wherein any introduced amplitude and phase errors are characterized in mathematical terms as being sufficiently low as to contain no first order terms.

4. A stable in-phase/quadrature generator for generating an in-phase output signal and a quadrature-phase output signal from an input signal, the generator comprising:

a first substantially 90°-phase delay circuit receiving the input signal and outputting an intermediate quadrature-phase signal;

a second substantially 90°-phase delay circuit receiving the intermediate quadrature-phase signal and producing an intermediate in-phase signal;

a signal doubler receiving the intermediate quadrature-phase signal and producing a quadrature-phase output signal at a substantially 90° phase angle; and a signal differencer receiving the input signal and the intermediate in-phase signal and producing an in-phase output at a substantially 0° phase angle.

5. The generator of claim 4, wherein said first and said second delay circuits exhibit frequency response and delay timing characteristics that are substantially matched with one another.

6. The generator of claim 4, wherein said signal doubler and said signal differencer exhibit frequency responses and delay time characteristics that are substantially matched with one another.

7. The generator of claim 5, wherein the generator is characterized by amplitude and phase stability over a broad range of manufacturing process, operating temperature and input signal frequency variation.

8. The generator of claim 7, wherein said doubler includes a summer two inputs of which are said intermediate quadrature-phase signal from said first delay circuit.

9. The generator of claim 8, wherein said differencer includes a summer one input of which is the input signal and another input of which is an inverted form of said intermediate in-phase signal from said second delay circuit.

10. The generator of claim 6, wherein said doubler includes a first summer two inputs of which are said intermediate quadrature-phase signal from said first delay circuit, wherein said differencer includes a second summer one input of which is the input signal and another input of which is an inverted form of said intermediate in-phase signal from said second delay circuit and wherein said first and second summers exhibit substantially matched frequency response and delay timing characteristics.

11. The generator of claim 9, wherein each of said first and second substantially 90°-phase delay circuits includes two or more series cascaded unity gain amplifiers collectively imposing a substantially 90° delay.

12. The generator of claim 4, wherein each of said first and second substantially 90°-phase delay circuits includes two or more series cascaded unity gain amplifiers collectively imposing a substantially 90°-phase delay.

13. The generator of claim 12, wherein each of said first and second substantially 90°-phase delay circuits includes three series cascaded unity gain substantially 30°-phase delays.

* * * * *